United States Patent Office 2,980,101
Patented Apr. 18, 1961

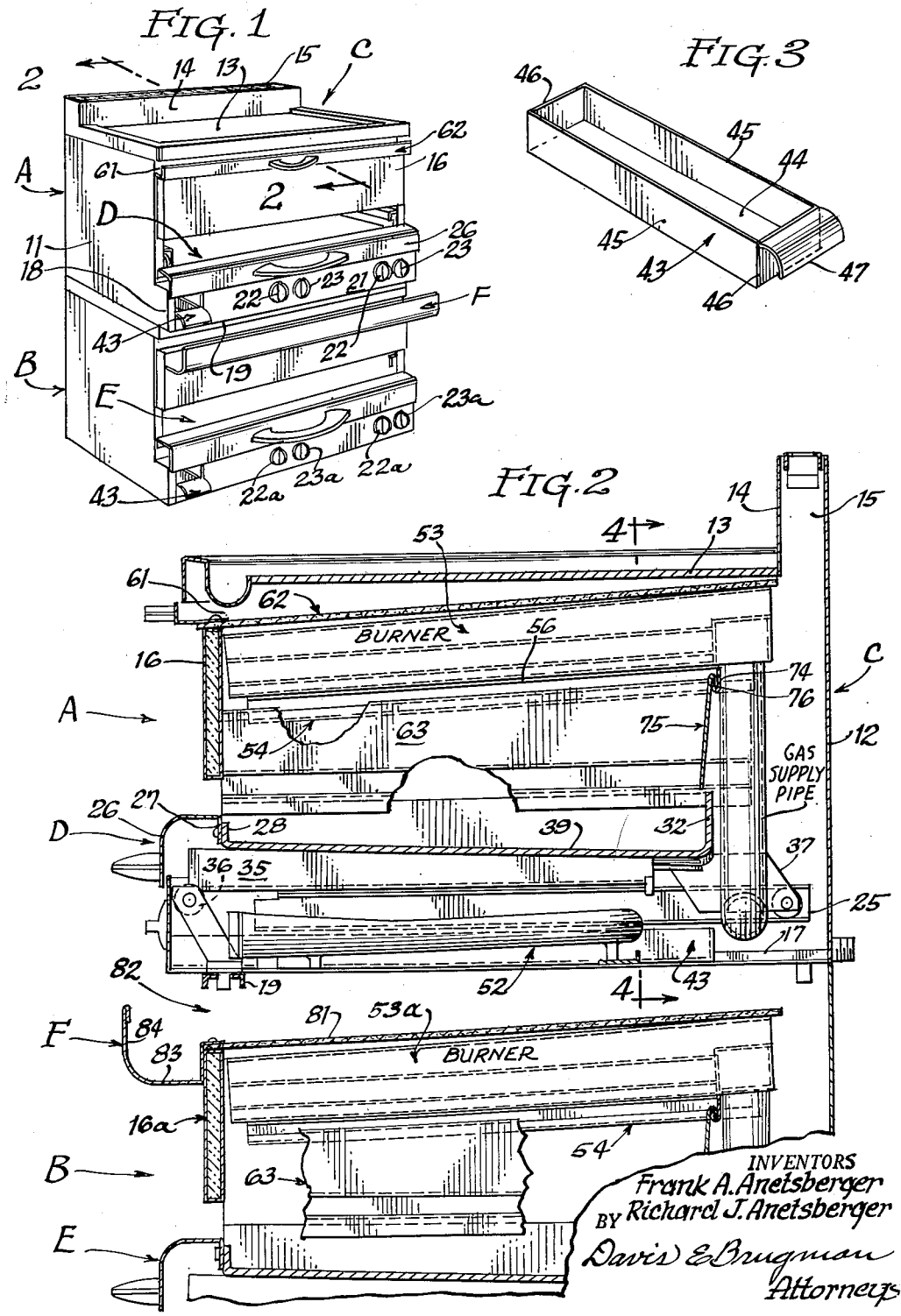

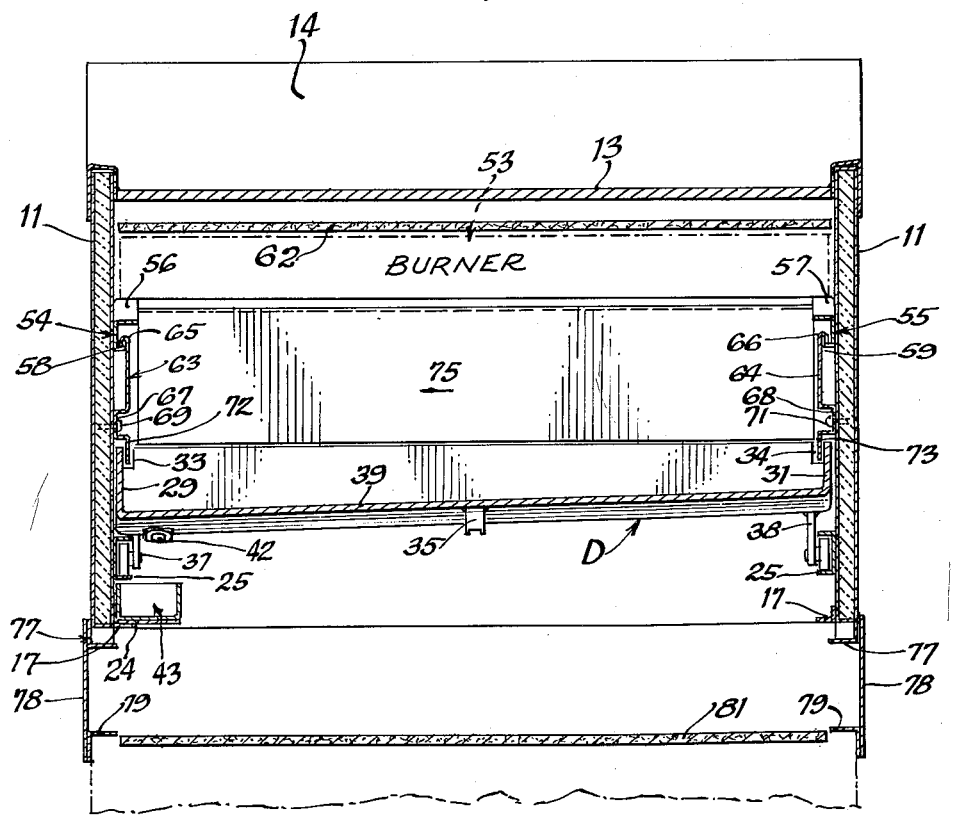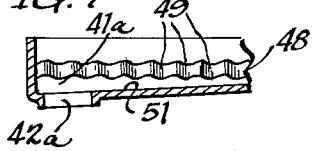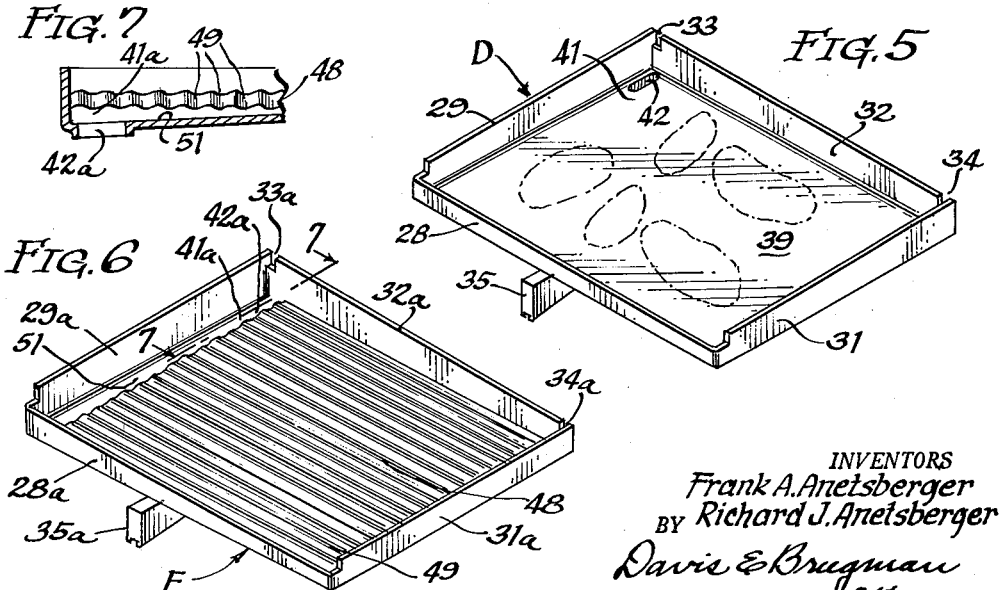

2,980,101

COOKING DEVICE

Frank A. Anetsberger and Richard J. Anetsberger, Northbrook, Ill., assignors to Anetsberger Brothers, Inc., Northbrook, Ill., a corporation of Illinois Filed Aug. 2, 1956, Ser. No. 601,797

2 Claims. (Cl. 126—41)

This invention relates to cooking apparatus, and particularly to a device for broiling food, such as steak or chops.

A principal object of the invention is to provide a novel broiling surface so constructed as best to insure complete and automatic drainage of grease therefrom during cooking.

Another object of the invention is the provision of a cooking device that will operate with maximum efficiency.

Still another object of the invention is the provision of a cooking device that will require a minimum of time and effort to clean after use.

A further object of the invention is to substantially eliminate the hazard of the grease that is produced during cooking catching on fire.

Another object of the invention is to insure maximum operating efficiency of a plurality of burners when disposed in vertical stacked relationship.

A further object is to provide a broiler in which the broiling surface can readily and quickly be converted to a frying or grill surface.

Numerous other objects and advantages of the invention will be apparent as it is better understood from the following description, which, when taken in connection with accompanying drawings, discloses a preferred embodiment.

In the drawings:

Figure 1 is a perspective view of a device embodying the present invention;

Fig. 2 is a vertical section taken substantially on the line 2—2 of Fig. 1;

Fig. 3 is a perspective view of the grease collecting drawer employed in the embodiment illustrated in Fig. 1;

Fig. 4 is a transverse vertical section taken substantially on the line 4—4 of Fig. 2;

Fig. 5 is a perspective view of a cooking drawer employed in the embodiment illustrated in Fig. 1;

Fig. 6 is a perspective view of a modified cooking drawer that can be employed in the embodiment illustrated in Fig. 1; and Fig. 7 is a detail section taken substantially on the line 7—7 of Fig. 6.

The embodiment of the invention illustrated in the drawings comprises an upper cooking unit A and a lower cooking unit B, with unit A supported by unit B in vertical stacked relationship. These two cooking units, of course, could be made integral as one complete unit. The cooking units A and B each have a supporting frame or housing so that when the cooking units A and B are placed in vertical stacked relationship their respective housings effectively form a housing C for the entire unit.

The upper cooking unit A comprises a cooking drawer D that is slidably mounted in the frame or housing for reciprocable movement from a cooking to a non-cooking position and also is removable from the unit. Located upwardly from the cooking drawer D are upper burners which can be employed to broil meat or other foods positioned on the cooking drawer D. Located below the cooking drawer D in the upper cooking unit A are lower burners which can be employed to cook or fry meat or other foods that are positioned on the cooking drawer D, or which may be employed simultaneously with the upper burners to broil food without requiring that the same be turned. The lower cooking unit B is somewhat similar to the upper cooking unit A, and comprises a lower cooking drawer E that is the same or similar to the upper cooking drawer D and is slidably mounted on the housing C for reciprocable movement from a cooking to a non-cooking position. Mounted above the lower cooking drawer E are upper burners which can be employed to broil food on the lower cooking drawer E when the lower cooking drawer E is in the cooking position. Mounted in the lower cooking unit B below the cooking drawer E are lower burners (not shown in the drawing) which can be employed to cook or fry meat or other foods that are positioned on the lower cooking drawer E, or which may be employed simultaneously with the upper burners to broil food without requiring that the same be turned.

When meat is cooked in a conventional cooking drawer, the grease produced by the meat frequently tends to accumulate in relatively large quantities on the cooking surface. This not only presents a recognized fire hazard, but also results in uneven or unequal cooking over the entire area of the food disposed on the cooking surface. In the present invention, however, each of the cooking drawers D and E comprises a substantially rectangular member (shown in Figs. 2, 4, and 5) for supporting food in cooking relation to the heat source. These substantially rectangular members each have an upper surface that is angularly disposed with respect to a horizontal plane so as to cause automatic drainage of the grease to a rearward corner of the drawer. In this corner there is a drain aperture which directs the flow of the grease downwardly into a collecting container or grease tray which acts to collect all the grease rendered from the food during cooking. Due to this automatic draining of the grease to the rearward corner of the drawer and its immediate drainage therefrom into the lower collecting container, the likelihood of the grease catching on fire is substantially prevented. Further, by locating the aperture at the rear of the cooking drawer and over a relatively long grease collecting tray which extends from front to rear of the housing, the cooking drawer may be moved forwardly from its normal rearward cooking position without interrupting the flow of grease into the grease collecting tray, which results in a clean and sanitary system for removing the grease from the cooking surface. And the automatic draining of the grease from the cooking surface insures uniform cooking over the entire area of the food disposed thereon.

When cooking burners are employed in vertical stacked relationship, the exhaust or spent gases from a lower burner frequently flow upwardly into the fresh or primary air intake passage for the burner disposed upwardly therefrom. When this occurs, the efficiency of the burner is substantially decreased by virtue of the resulting reduction of available oxygen because of the impairment of the flow of primary air. This results in uneven heat distribution to the cooking area, increases the cost of operation of the cooking apparatus, and exhausts atmosphere-contaminating gases due to incomplete combustion. In a drawer type cooking apparatus, generally similar to the one disclosed, this action generally results in the front or outer portion of the cooking surface having substantially less heat than the inner or rear portion. This tends to result in grease accumulating at the outer or front portion, thus requiring more frequent cleaning of the cooking drawer. In the present invention, however, as part of this exhaust or spent gases, and in particular that from the upper burner of the lower cooking unit B, flows upwardly from the lower cooking unit outwardly above the lower cooking drawer E, it will contact a deflection plate F which will deflect such exhaust away from the fresh or primary air intake for the burners of the upper cooking unit A, and more particularly the fresh air intake passage of the lower burner of the upper cooking unit A. By employing the deflection plate F in the position disclosed, the fresh or primary air intake passages for the upper and lower burners of the upper cooking unit A receive a maximum amount of air to obviate the above-mentioned disadvantages.

To insure that only clean grease is on the cooking area and to facilitate cleaning of the cooking device after use, splatter shields are employed in both cooking units A and B. A splatter shield is employed on each side of each of the cooking trays D and E. These splatter shields are releasably secured to the sides of the housing and extend downwardly so that the ends thereof are disposed slightly inwardly of the periphery of the cooking surface. In addition, an end splatter shield is employed at the rear of the housing adjacent the rear end of each of the cooking drawers. Each such rear splatter shield is releasably mounted on the housing and extends downwardly so that the lower edge thereof is located somewhat inwardly of the inner or rear edge of the cooking drawer, while terminating slightly above the same. The splatter shields prevent grease from dropping downwardly onto the lower burners and catching fire, drain splattered grease back onto the peripheral portions of the cooking surfaces, and prevent other parts of the cooking device from becoming coated with grease. Since the splatter shields are removable, they can be cleaned frequently so that the splattered grease dripping downwardly therefrom onto the cooking surface will not affect the taste of the food being cooked.

Referring more particularly to the drawings, the upper cooking unit A comprises a housing having two side walls 11 and a rear wall 12. Supported on the upper edges of the side walls 11 and the rear wall 12 is a rectangularly shaped grill plate 13. Extending upwardly from the grill plate 13 is a rectangularly shaped plate 14. Side plates are connected at either end of the plate 14 between the plate 14 and the rear wall 12 to form an exhaust flue 15 for the exhaust gases of the cooking device. Secured to the inner side of the side walls 11 are two horizontally disposed angle members 17, as shown in Fig. 4. These angle members 17 support the lower burners of the upper cooking unit and also the grease-collecting trough to be later described. The side walls 11, as shown in Fig. 1, have at the lower ends thereof outwardly extending, rectangularly shaped, front portions 18. Secured to the underside of the front portions 18 is a supporting channel 19, as best seen in Fig. 2. Secured to, and supported by, the supporting channel 19 and the front portions 18 is a rectangularly shaped control panel 21 having knobs 22 and 23 for controlling the gas flow to the lower and upper burners, respectively, of the upper cooking unit. Secured to the angle member 17 at the left side of the cooking unit, as shown in Fig. 3, and to the supporting channel 19, is a supporting plate 24 for supporting the grease-collecting drawer, and the control panel 21 terminates short of the left wall portion 18 to permit removal of the grease-collecting drawer.

The cooking drawer D comprises a front panel 26 which extends longitudinally for the entire width of the upper cooking unit A, as shown in Fig. 1. This front panel 26 has a generally horizontal top portion (Fig. 2) and a generally vertical outer portion with a suitable handle secured to the outer portion. At its rear, the front panel 26 terminates in a downwardly extending plate 27. The main body of the drawer (best seen in Fig. 5) preferably is rectangular in plan, is narrower than the distance between the side walls 11 to fit freely therebetween, and has a front wall 28 which is secured in any suitable manner to the inner plate 27 of the front panel 26, as shown in Fig. 2. The drawer also comprises two side walls 29 and 31, and a vertically disposed rear wall 32. Extending downwardly from the upper edge of the rear wall 32, at either end thereof, are two vertically disposed slots 33 and 34. A vertically disposed guide member 35 is secured to the bottom of the drawer, preferably near the center thereof, that extends parallel to the side walls 29 and 31. The lower edge of the guide member 35 is substantially horizontal and has a longitudinally disposed recess therein that is adapted to receive and ride upon a roller 36 (Fig. 2) rotatably mounted on an arm which is secured to the supporting channel 19. As shown in Figs. 2 and 4, a relatively short supporting leg 37 extends downwardly from adjacent the rear leftmost corner of the underside of the drawer which has a roller rotatably mounted at the lower end thereof. Extending downwardly from adjacent the rear right-hand corner of the underside of the drawer (Fig. 4) is a similar, but relatively long, supporting leg 38 having a roller rotatably mounted at the lower end thereof. The rollers carried by the legs 37 and 38 are positioned so that they will roll in the two side guide channels 25, and the lengths of the legs 37 and 38 are such that the upper edges of the walls 28, 29, 31, and 32 will be substantially horizontal, although the drawer bottom surface 39 slopes downwardly from right to left and from front to rear. A slot (not shown) is provided in the front panel 21 in alignment with the guide member 35 so that, as the cooking drawer D is moved outwardly, the guide member 35 will pass therethrough. As the cooking drawer D is moved inwardly or outwardly with respect to the upper cooking unit A, the guide member 35 will be continually supported by the roller 36, and the rollers at the end of the legs 37 and 38, which are disposed within the corresponding guide channels 25, will cooperate therewith to maintain the upper edges of the walls 28, 29, 31, and 32 substantially horizontally disposed at any position.

In the embodiment disclosed in Fig. 5 of the drawings, the bottom of drawer D comprising a subsantially rectangular member 39 has an upper surface which is substantially planar and is tilted in two directions, that is to say, it defines a plane which is tilted downwardly, both to the left and also rearwardly. Expressing it another way, the leftmost edge of the upper surface of the member 39, as shown in Fig. 4, is located downwardly from the rightmost edge of the upper surface, and the rearward edge of this surface is located downwardly from the front edge thereof, while the whole surface is disposed in one plane. By this two-directional tilt of the planar surface of the member 39, any grease or other liquid will flow diagonally toward the leftmost rear corner, which is designated by reference numeral 41 in Fig. 5.

Extending downwardly through the corner portion 41 of the rectangular member 39 is a drain aperture 42, as shown in Figs. 4 and 5 of the drawing. As the cooking drawer D is moved back and forth in and out of the upper cooking unit A, the drain aperture 42 will move in a straight line parallel to the side walls 11. Supported by the plate 24 below the drain aperture 42 is a grease-collecting drawer 43, as shown in Figs. 4 and 3 of the drawing. The grease-collecting drawer 43 is slidably suported on the plate 24 between the front panel 21 and the front portion 18 of the leftmost side wall 11, as shown in Fig. 1. The grease-collecting drawer 43 is generally rectangular in shape and is approximately the length of the side walls 29 or 31 so that, as the cooking drawer D is moved inwardly or outwardly of the upper cooking unit A, the drain aperture 42 will always be above the grease drawer 43 to direct the flow of grease into the grease drawer 43 whether the cooking drawer D is in a retracted cooking or an extended non-cooking position.

As shown in Fig. 3, the grease drawer 43 comprises a generally rectangular box-like structure having a bottom plate 44, two generally rectangular side plates 45, and two end plates 46. An arcuately shaped handle member 47 is secured to the outermost end plate 46, so that the grease drawer may be conveniently slid into or out of its grease collecting position.

Fig. 6 illustrates another embodiment of a cooking drawer which comprises a substantially rectangular member E for suporting food in cooking relationship to the burners. The member E in this embodiment comprises a rectangularly shaped grill section 48 which is corrugated or provided with a plurality of parallel grooves or recesses 49, as shown in Figs. 6 and 7. The grill section 48 is tilted downwardly toward the left side of the upper cooking unit, viewed from the front of the device, so that its leftmost edge is disposed downwardly from its rightmost edge and all of the grooves 49 slope downwardly to the left of the drawer. Hence, when meat is being cooked on the grill section 48, the grease will fall downwardly into the grooves 49 and drain toward the left portion of the member E. Formed along the leftmost edge of the grill section 48 is a drain trough 51 which slopes downwardly towards the rear fo the member E so that, as the grease drains from the grooves 49, it will flow down the sloping grease trough 51 and be directed toward the left rear corner 41a of the member E. A drain aperture 42a is located in the corner 41a for draining grease downwardly into the grease-collecting tray 43. Extending upwardly from the member E are front wall 28a, side walls 29a and 31a, and a rear wall 32a. The upper edges of the side walls 29a and 31a and the rear wall 32a preferably are horizontally disposed and located within the same plane. At either end of the rear wall 32a are downwardly extending slots 33a and 34a corresponding to slots 33 and 34 in rear wall 32 of drawer D. Parallel to the side walls 29a and 31a, and extending downwardly from the underside of the member E is a guide flange 35a which preferably is located in the center of the cooking drawer. The embodiment illustrated in Fig. 6 also includes rearward suporting legs (not shown) similar to the supporting legs 37 and 38, having rollers rotatably mounted at the lower ends thereof. These rollers are positoned similarly to those of the embodiment illustrated in Fig. 5 and are adapted to roll simultaneously in the two guide chanels 25. The lower edge of the guide flange 35a has a longitudinally disposed recess therein that is adapted to engage the roller 36 illustrated in Fig. 2. Hence, when the guide flange 35a is resting on the roller 36 and the rear rollers are slidably mounted within the two guide chanels 25, the lower edge of the guide flange 35a will be horizontally disposed, so that during reciprocable movement of the cooking drawer E, the upper edges of the walls 29a, 31a, and 32a will remain horizontal and the angle of the grill section 48 and the draining trough 51 will remain constant. In the embodiment illustrated in Fig. 6, a front panel similar to front panel 26, having a handle thereon, is secured to the front wall 28a. By this construction, the cooking drawer illustrated in Fig. 6 may be moved conveniently from cooking to non-cooking positon. During this movement, as in the case of the embodiment shown in Fig. 5, the drain aperture 42a will always be above the grease-collecting tray 43 so that grease will drain into the tray 43 despite the reciprocal movement of the cooking drawer.

In order best to use the whole of the cooking area when a plurality of pieces of meat are being cooked, they should be placed either parallel to the side walls or parallel to the end or rear walls. If meat is placed on a planar cooking surface in a position transverse to the direction of flow of the grease, grease will collect at the upper side of the meat and will be unable to drain downwardly off the cooking surface. In the embodiment of Fig. 6, this is obviated by the grooves 49. In the embodiment illustrated in Fig. 5, however, grease will drain readily from the cooking surface, despite the whole of the latter being disposed in one plane, regardless of whether the meat pieces are placed parallel to the side walls or parallel to the rear or front walls, because of the two-directional slope of the planar cooking surface.

Lower burners 52 (Fig. 2) are supported near the bottom of the upper cooking unit A by supporting bars which are supported at either end by the two angle members 17. These burners are connected to a suitable source of gas through valves controlled by the control knobs 22. When the drawer D is in its innermost or cooking position, the lower burners transmit heat upwardly to cook or fry meat or other foods that are placed on the surface 39. Located above the cooking drawer D are upper burners 53 (illustrated diagrammatically in Figs. 2 and 4). Secured to the inside of the two side walls 11 are two hanger members 54 and 55 which extend nearly the full depth of the upper cooking unit A and are tilted slightly upwardly toward the rear of the unit. The hanger members 54 and 55 have upper inwardly directed portions 56 and 57, respectively, upon which the top burners 53 are supported. These hanger members have an intermediate and substantially vertical portion which is secured to the inner side of the side walls 11. The lower ends of the hanger members 54 and 55 terminate in upwardly extending flanges or mounting plates 58 and 59, respectively.

An opening 61 (Fig. 2) is provided in the front of the upper cooking unit A between the grill plate 13 and the front panel 16. A rectangularly shaped, fire-proof, heat insulating and deflecting member 62 is slidable through this opening and is supported within the unit by brackets extending outwardly from the two side walls 11. This insulating member preferably is made of asbestos and is positoned between the grill plate 13 and the upper burners 53 so that, when it is in the positon shown in Fig. 2, the grill plate 13 will not be substantially heated. However, when the insulating member 62 is removed from the upper cooking unit A, the upper cooking burners 53 will supply heat to the grill plate 13 for frying food thereon. Hence, the upper burners 53 function as a source of heat for the grill plate 13, or as a heat source for broiling or cooking food positioned on the cooking drawer D. If the insulating and deflecting board or plate 62 is employed, as shown in Fig. 2, the drawer will function as a broiler, and if both upper and lower burners 53 and 52 are used, it will not be necessary to turn the food over that is being cooked.

Mounted on the two mounting plates 58 and 59 of the hanger members 54 and 55 are two grease splatter guards 63 and 64 (Figs. 2 and 4). These splatter guards are trapezoidal in shape, with the lower edge thereof being substantially horizontal, and have upper hook portions 65 and 66, respectively, which are adapted to rest on and be supported by the two mounting plates 58 and 59. In their mounted position, the upper edges of the guards 63 and 64 are substantially parallel to the upper edge of the mounting plates 58 and 59, whereas the lower edges of the guards 63 and 64 are substantially horizontal. These splash guards 63 and 64 have longitudinally disposed and outwardly extending recesses or channel portions 67 and 68 dimensioned with relation to their main body portions and the mounting plates 58 and 59 so as to contact the walls 11, whereby they may be readily removably secured thereto, if desired, by screws 69 and 71. As shown in Fig. 2, the guard 63 (as well as the guard 64) is mounted adjacent to and extends rearwardly somewhat beyond the drawer D when the latter is in its rearmost cooking position. As seen best in Fig. 4, the lower portions 72 and 73 of these guards are positioned inwardly of the side walls 29 and 31 of the drawer and are aligned with the slots 33 and 34 of the rear wall 32 of the drawer D. By this construction, the cooking drawer D may be moved inwardly and outwardly and the splatter guards will render the maximum amount of protection for preventing the grease from lodging in inaccessible and critical places. Since these guards are readily removable, they can be cleaned frequently to insure that any grease dripping downwardly back onto the cooking surface will be clean and not affect the taste of the cooking food. Mounted on the upper burner structure 53 in pendant relationship is a rear hanger member 74 (Fig. 2) having a J-shaped sectional configuration and extending across the width of the cooking drawer D. Mounted on the hanger member 74 is a substantially rectangular rear splatter guard 75 having a mounting flange extending downwardly from the upper edge thereof which is only slightly thinner than the distance between the two legs of the J-shaped hanger member 74. The lower body portion of the rear splatter guard 75 is angularly disposed with respect to the mounting flange 76 so that, when the flange 76 is disposed in the J-shaped portion of the hanger member 74, the rear guard will be angularly disposed towards the front of the cooking unit. As shown in Fig. 2, when the cooking drawer D is in the cooking position, the lower edge of the rear splatter guard 75 is disposed somewhat inwardly from the rear wall 32 of the drawer to prevent grease from splattering out of the pan and downwardly therefrom. Hence, during a cooking operation, splattering grease will be generally restricted to hitting the splatter guards 63, 64, and 75, and each of these overhang the drawer D. Since the splatter guards are easily removable, they can be cleaned frequently to insure that the grease dripping downwardly therefrom onto the cooking surface will not affect the taste of the food being cooked.

The lower edges of the side walls 11 of the upper cooking unit A, below the front portion 18, are supported by angle members 77 (Fig. 4) which are mounted on the inside of the side walls 78 of the lower cooking unit B. Below the angle members 77 are two angle members 79 secured to the inside of the side walls 78, as shown in Fig. 4. These angle members 79 are tilted somewhat upwardly towards the rear of the cooking unit and support a rectangularly shaped insulating board 81 which preferably is made of asbestos or other suitable insulating material. The insulating board 81 does not extend through the entire depth of the lower cooking unit B so as to provide an exhaust passage for the spent or exhaust air to travel upwardly therethrough and subsequently through the exhaust or flue passage 15. The space between the lower burners 52 of the upper cooking unit, and the insulating member 81, comprises a fresh or primary air intake passage for the lower burners 52. The lower cooking unit B has a front panel 16a similar to the front panel 16 of the upper cooking unit A that is secured to the side walls 78 of the lower cooking unit. Extending outwardly from the upper portion of the front panel 16a is a deflector plate F, as shown in Figs. 1 and 2. This deflector plate F comprises a lower substantially horizontal portion 83 and an integral vertical portion 84. As shown in Fig. 1, the deflector plate F is disposed across the entire width of the cooking unit.

The remaining elements of the structure of the lower cooking unit B are duplicates of the elements contained in the upper cooking unit A and are designated by the same numbers as the corresponding identical members with the suffix *a*. The lower cooking unit contains a cooking drawer E that is mounted for reciprocal movement in the same manner as the upper cooking drawer D. Further, the lower cooking unit B has upper burners 53a that are identical to the upper burners 53 and lower burners (not shown) which are identical to the lower burners of the upper cooking unit A. The lower cooking unit also has splatter guards which are identical to the splatter guards 63, 64, and 75 of the upper cooking unit and are mounted in the same manner. The bottom of the lower cooking unit is open similar to the bottom of the upper cooking unit A. Legs (not shown) are secured to each corner of the bottom of the lower cooking unit B for supporting the cooking device a convenient distance above the floor.

When both cooking units are in use, the lower burners of the upper cooking unit will receive primary air through the passage 82. Most of the exhaust from this burner will travel upwardly at the rear of the cooking drawer D and through the flue passage 15. However, if the upper burners 53a of the lower cooking unit B are being employed at the same time as the lower burners 52 of the upper unit, some of the exhaust from the upper burners 53a of the lower unit normally would travel outwardly between the front panel 16a and the cooking drawer E and into the primary air intake passage 82 for the other burner so as to substantially decrease the combustion efficiency of this burner. In the present invention, however, this action will be substantially prevented by the deflector plate F which directs the exhaust from the upper burners 53a outwardly away from the fresh air intake passage 82 for the burners 52. Consequently, the disclosed device employs two cooking units in vertical stacked relationship that can be employed simultaneously without substantially decreasing the combustion efficiency of the upper unit. Further, the deflector plate F deflects the warm or hot exhaust air from the burners 53a away from the control knobs 22 and 23 on the front of the upper cooking unit A, thereby preventing damage to these knobs and overheating which might otherwise render their manual operation inconvenient.

In the operation of the disclosed cooking device, the cooking drawers D and E may be pulled outwardly to a non-cooking position for loading the meat or other food. The meat preferably is placed on the cooking surface of the drawer in a direction parallel to either the side walls or the rear wall thereof so as to utilize the whole cooking surface of the cooking drawer. The cooking drawers are then pushed rearwardly to a cooking position within the upper cooking unit A and the lower cooking unit B, respectively. The upper and lower burners of the upper cooking unit A and of the lower cooking unit B are controlled by the control knobs 22, 23, 22a, and 23a, respectively. When meat is being cooked, grease from the meat will automatically drain to the left rear corner of the drawer so as to quickly drain away from an area of high heat intensity. This is true despite the fact that the major lengths of the meat are placed parallel to either the side or the rear walls of the drawer. If the cooking drawer illustrated in Fig. 5 of the drawing is being employed, the meat necessarily will not be positioned in a direction perpendicular to the tilt of the member E for supporting the meat. Consequently, the grease will drain down either side of the meat and into the left rear corner 41, and thence downwardly through the drain aperture 42 and into the grease drawer 43. Due to the fact that the meat is not placed transverse to the direction of tilt of the member E, the grease will not collect at the upper side of the meat, but rather will flow quickly downwardly towards the corner 41. Hence, in this embodiment quick automatic drainage of grease is effected even when the cooking area has been fully utilized.

When the grease drawer illustrated in Fig. 6 is employed, grease will drain downwardly from the meat into the grooves 49, and these grooves, being tilted generally towards the left, will direct the flow of the grease into the grease trough 51. Grease trough 51 is tilted downwardly towards the rear of this grease drawer so that it will, in turn, direct the flow of the grease towards the left rear corner 41a and downwardly through the drain aperture 42a. Hence, if either the cooking drawer illustrated in Fig. 5 or the cooking drawer illustrated in Fig. 6 is being employed, the grease will drain quickly towards the left rear corner and downwardly through the drain aperture. Hence, both of these grease drawers effect the automatic drainage of the grease away from an area of high heat intensity so as to decrease the hazard of the grease catching on fire and to insure uniform cooking of the meat. When the grease drains downwardly through the drain aperture, it will fall into the grease-collecting drawer 43, and even during movements of the drawers between cooking to non-cooking positions, the grease will continue to drain into the grease-collecting drawer 43, because the latter extends the full length of the normal reciprocating movement of the grease drain.

During the cooking operation, grease may splatter upwardly and outwardly, and in the conventional cooking apparatus it will thereby collect on the rollers and other critical parts of the cooking unit. In the present invention, however, the splash guards 63, 64, and 75 will prevent such deleterious grease collection. Although these guards present a closely constructed guard for grease splattering from the cooking drawer, they permit reciprocal movement of the cooking drawer from a cooking to a non-cooking position by virtue of the slots 33 and 34, or 33a and 34a, straddling the lower end of the side splash guards. When these splatter guards become sufficiently dirty or coated with grease they may be quickly removed and cleaned.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

We claim:

1. In a cooking device having a heat source, a supporting frame, a rectangularly shaped cooking drawer slidably mounted on said supporting frame for horizontal reciprocal movement relative to said heat source between a cooking and a non-cooking position, and a spatter shield extending downwardly from said frame toward said cooking drawer, the lower end of said shield being located inwardly of the periphery of said cooking drawer when said cooking drawer is in said cooking position, said cooking drawer comprising a substantially rectangular member for supporting food in cooking relationship to said heat source, an end wall extending upwardly from the rear end of said member, a side wall extending upwardly from one side of said member, a slot extending downwardly into said end wall, and said spatter shield extending downwardly into said slot to effect clearance for reciprocal movement of said cooking drawer.

2. In a cooking device having a heat source, a supporting frame, a rectangularly shaped cooking drawer slidably mounted on said supporting frame for horizontal reciprocal movement relative to said heat source between a cooking and a non-cooking position, said cooking drawer comprising a substantially rectangular member for supporting food in cooking relationship to said heat source, two side walls extending upwardly from said member at opposite sides thereof, an end wall extending upwardly from the rear end of said member between said two side walls, two vertically disposed slots in said end wall at either end thereof, two side spatter shields removably mounted on said frame and extending downwardly therefrom at opposite sides of said member, the lower ends of each said side shield being located within a corresponding said slot in said end wall, and an end spatter shield removably mounted on said frame and extending downwardly therefrom, the lower end of said end shield being located slightly above said end wall and inwardly thereof when said cooking drawer is in said cooking position.

References Cited in the file of this patent

UNITED STATES PATENTS

| | | |
|---|---|---|
| 850,058 | Ross | Apr. 9, 1907 |
| 1,010,026 | Cronwall | Nov. 28, 1911 |
| 1,010,169 | Noreck | Nov. 28, 1911 |
| 1,012,054 | Berry | Dec. 19, 1911 |
| 1,051,503 | Klein | Jan. 28, 1913 |
| 1,373,788 | Ball | Apr. 5, 1921 |
| 1,505,273 | Maul | Aug. 19, 1924 |
| 1,554,612 | Wilson et al. | Sept. 22, 1925 |
| 1,615,356 | Bellamy | Jan. 25, 1927 |
| 2,011,848 | Chambers | Aug. 20, 1935 |
| 2,046,973 | Schroeder | July 7, 1936 |
| 2,180,868 | Dunning et al. | Nov. 21, 1939 |
| 2,277,446 | Moecker | Mar. 24, 1942 |
| 2,283,853 | Frick | May 19, 1942 |
| 2,309,784 | Peron | Feb. 2, 1943 |
| 2,345,480 | Jones | Mar. 28, 1944 |
| 2,456,988 | Pierson | Dec. 21, 1948 |
| 2,488,215 | Mayne | Nov. 15, 1949 |
| 2,536,513 | O'Keefe | Jan. 2, 1951 |
| 2,612,590 | Lachowicz | Sept. 30, 1952 |
| 2,746,448 | Holmsten | May 22, 1956 |
| 2,790,436 | Pearcy | Apr. 30, 1957 |
| 2,854,918 | Merritt | Oct. 7, 1958 |
| 2,879,763 | Long | Mar. 31, 1959 |

FOREIGN PATENTS

| | | |
|---|---|---|
| 441,059 | Great Britain | Dec. 27, 1935 |
| 236,559 | Switzerland | June 16, 1945 |